Patented Dec. 5, 1944

2,364,592

UNITED STATES PATENT OFFICE 2,364,592

DIPPING COATING FOR FROZEN CONFECTIONERY PRODUCTS

Norman M. Thomas, Medford Lakes, and Norman H. Thomas, South Orange, N. J., assignors to Joe Lowe Corporation, New York, N. Y., a corporation of Delaware No Drawing. Application October 27, 1942, Serial No. 463,540

2 Claims. (Cl. 99—137)

The present invention relates generally to confectionery coatings and an improved method of making the same, and it has specific relation to a water base coating which is suitable for covering the exposed surfaces of ice cream or the like confectionery products when the same are momentarily dipped or immersed therein.

All such dipping coatings have, heretofore, been of the oil base type, and consisted of dry ingredients, such as flavoring materials in powdered form, sugar, and milk solids suspended in an oil or fat base. The base of such conventional coatings consisted generally of oils that have a melting point below body temperatures, such as, for example, cocoanut oil, cocoa butter, babasu oil, peanut oil, cottonseed oil, sesame, or combinations thereof. These coatings, to be usable commercially as a coating material for ice cream and similar products, must, in order to obtain the surface area coverages required in commercial practices, have a very high free fat content. Where such dipping coatings are especially prepared for coating frozen confectionery products, the free fat content, in all instances, exceed fifty percent (50%) by weight of the final coating product. Such coatings, therefore, have an oily taste or impart an oily feeling, which is highly objectionable to many people. These oil or fat base coatings are sold either in solid form or in the form of a heavy viscous syrup, and require heating to between ninety degrees F. and one hundred and fifteen degrees F. to melt the fat content in order to provide the required fluidity for use in coating confectionery products by a dipping or immersion process. These fat or oil base coatings are of a character such that they become hard and non-sticky at normal room temperatures or temperatures slightly below their melting points, forming a hard outer protective coating for confectionery products at such temperatures. These dipping coatings must be kept entirely free of water, because free water causes them to thicken to a point where they are not commercially suitable for further use.

In the course of use in coating frozen confectionery products, the heat of the coating material causes a melting of the ice of the frozen confections, which meltings fall into the coating material as free water or milk, and, as such, have a tendency to quickly thicken the coating material to such a degree that it is incapable of further use as a dipping coating material. It is well known that there is a direct relationship between the viscosity of the coating material at dipping temperatures and the thickness of the coating applied to the products dipped or immersed therein. It is equally well known that the slightest addition of free water, such as normally contained in the meltings of frozen ice cream and similar substances, even in an amount approximating one percent by weight, renders such oil or fat base coatings unsuitable for further use as a dipping coating. The slightest amount of free water tends to thicken the coating so that it will not coat properly when the confectionery product is dipped therein. While the exact chemical change is not entirely understood, it is believed that the addition of such free water tends to break down the emulsion characteristics of the original coating, changing its character so as to make it unfit for the purpose for which it was designed originally. It has been found that the addition of small quantities of lecithin to such coating material tends to delay its breaking point, which is the point at which the coating is no longer considered commercially suitable for dipping purposes.

It has further been discovered that, once free water becomes mixed with such types of oil or fat base coatings whereby they are rendered unfit for further use as a commercial dipping coating, they cannot be reconstituted by treatment tending to drive off such excessive or undesirable water additions. Attempts have frequently been made to remove such free water, but in every instance the coating material has been damaged to an extent that its taste, color or flavor is considered unsuitable for commercial use as a coating material. When such dipping coatings are rendered unfit for further commercial use as a dipping coating, due to thickening resulting from the addition of free water, they are not thereby rendered unfit for human consumption. The thickened coating material may be used for other purposes, such as, for example, flavoring ice cream, candies, etc.

It is also recognized that such dipping coatings cannot be heated to higher temperatures in order to increase their fluidity and thereby overcome or delay the breaking point of its use as a commercial dipping coating. The icy structure of the frozen confectionery products to be coated limit the temperature range within which the operation can be carried on economically. If the temperature is too high, coating by dipping is impossible or impractical, because too much melting of the product takes place during the dipping step, resulting either in destruction of the product or spoilage of the coating material due to the water present in such excessive meltings.

Furthermore, all such oil base coatings of the type hereinabove referred to have certain other serious disadvantages that make them highly objectionable commercially. Such disadvantages, however, have not kept them from extensive commercial use, because nothing better has ever been offered in the form of a dipping coating as a substitute therefor. These oil or fat base coatings do not adhere well to the ice cream because the fat or oil has no affinity for the water in the ice crystals, which melt and reform into a hard and smooth icy film over the exposed irregular porous surfaces of the frozen confectionery body when it is dipped into the molten bath of the heated coating material. The major bond that is formed in such instances is by the coating material forming a continuous and integral shell entirely about and encircling the frozen confectionery product. The coefficient of thermal expansion and contraction of an oil or fat base coating is radically different from that of the water base core of ice cream or similar substances, and, consequently, changes in temperature change the relative sizes of the coating and the core so that any bond therebetween becomes broken, cracked or freed entirely.

The hard outer protective shell of an oil base or fat base coating also tends to chip or crack very readily either in transit from the manufacturer to the consumer, or while being eaten by the consumer. Substantial portions of the coating material, as a consequence, have a tendency to fall away from the confectionery core onto the clothing of the purchaser, or to the floor, rugs or ground. Frozen confectionery products thus coated with an oil or fat base coating are exceedingly difficult, if not actually messy, to eat, which objection causes many losses in sales. Fastidious persons will not venture to eat them, especially when they are mounted on a stick, because of the fear of damaging or soiling their hands, clothes, or rugs with falling pieces of coating material. Moreover, the great differences in melting points between the oil or fat base coating and the frozen confection material causes a breaking away of the former from the latter, because the confection material adjacent the coating tends to melt, causing the unmelted coating chips to slide away therefrom when they are broken away from the integral shell in eating.

In an effort to overcome these disadvantages of the oil or fat base coatings, there has been developed a frozen coating material, which is frozen onto an ice cream or similar core in a double molding operation. This coating material, while it may be flavored with chocolate or any other flavor, is substantially all water, and, when it is molded onto the core, is substantially like water ice or sherbet in taste, appearance and other characteristics. Such water ice types of frozen coating material are entirely different from the coating material forming the subject-matter of this invention, and are incapable of being applied by a simple dipping or immersion operation. Such coatings must always be frozen onto the ice cream in a double molding operation.

The coating material forming the subject-matter of the present invention obviates all of the disadvantages of the prior art coatings. It has a flavor and taste appeal substantially equal to if not greater than the former conventional oil base coatings, but being entirely free of the oily taste and feel of the oil base coatings. It is also entirely free of the icy crystalline structure of the frozen coatings. The present coating is capable of being made up and sold in powder form, being capable of keeping indefinitely on the open shelf; is economical to package and ship since the bulkiest ingredient, the water, is added by the customer when it is to be made up into a dipping coating; and is capable of being applied quickly and easily by a simple dipping operation at low temperatures which closely approximate the melting point of the core material. The present coating is also not affected materially by the addition of free water, as in the case of the fat or oil base coatings, and does not have a tendency to cause any excessive melting of the exterior surfaces of the confectionery product since it does not have to be heated as in the case of the fat or oil base coatings. The improved coating, having substantially a water base, has a definite affinity for the icy crystalline structure of the core material, forming a perfect union between the two substances, and will not chip, crack or flake off in transit or while being eaten because its coefficient of expansion and contraction is similar to that of the water base core of the ice cream or similar substances. It therefore has no tendency to crack or to be freed entirely from the core material as a result of temperature changes. It may also be made up into a variety of flavors.

An object of the present invention is to provide a new and novel method for efficiently and economically manufacturing a dipping coating material that is suitable for coating frozen confectionery products by a dipping or immersion process.

Another object of the present invention is the provision of a new and novel dipping coating material for ice cream and the like products which will remain liquid at far below normal room temperatures; which will adhere in the form of a thin film to the surfaces of frozen confectionery products when the same are dipped momentarily therein; and which will quickly become hard and firm at atmospheric temperatures due to the latent refrigeration of the frozen core material to form a relatively thin hard outer protective coating therefor.

A further object of the invention is to provide a dipping coating of the type which will not chip, crack or flake off the surface of a frozen confectionary product when the same is being handled in transit or being eaten.

Another object of the present invention is to provide a coating material which is substantially devoid of free fats or oils; which is therefore readily digestible; and which is non-fattening from a caloric standpoint as compared to conventional coatings since the free fat content of the latter coatings has been entirely replaced by water.

A further object of the invention is the provision of a dipping coating material for frozen confectionery products that may be made up into a dry powder which will keep indefinitely on an open shelf, and which is exceedingly light in weight as compared to conventional dipping coating materials and therefore relatively cheap and inexpensive to ship to the trade.

Another object of the invention is to provide a delectable coating that has a pleasing taste and imparts an appeal, feel or touch sensation to the tongue of the consumer.

Various other and further objects and advantages of the invention, which result in simplicity, economy and efficiency, will be apparent from the following detailed description of the method employed and the ingredients used in making the same.

In making up coatings of the type of the present invention, the particles of the various dry ingredients must be reduced to a size which will prevent the separate ingredients from settling out in the final dry admixture during handling and shipment from the place of manufacture to the place where it is to be made up into a liquid dipping coating material. It has been found that when the particles of the several basic ingredients have been reduced to the following sizes, the final powdery admixture will not have a tendency to separate into its several constituents during handling in shipping:

|  | Starch | Milk powder | Sugar | Malt |
|---|---|---|---|---|
|  | Per cent | Per cent | Per cent | Per cent |
| On 20 mesh screen | 0.7 | 0.5 | 0.7 | 0.2 |
| On 20-30 mesh screen | 0.6 | 0.6 | 1.1 | 0.5 |
| On 30-60 mesh screen | 1.9 | 1.7 | 1.7 | 2.6 |
| On 60-100 mesh screen | 1.4 | 3.6 | 4.0 | 12.0 |
| On 100-150 mesh screen | 2.0 | 4.0 | 5.0 | 16.0 |
| Through 150 mesh screen | 93.4 | 89.6 | 87.5 | 68.7 |

After the dry ingredients have been properly mixed together in any suitable type of mechanical mixer, which is capable of performing the admixing thoroughly and with an even distribution of the several basic ingredients throughout the final powdery admixture, the same may be packed in any suitable type of moisture proof container for shipment to the trade. In this state or condition, the dry powdery product will keep indefinitely upon an open shelf without special handling or storage under special climatic conditions.

When the trade desires to make up the dry materials into a suitable dipping coating, the dry materials are removed from the container and stirred thoroughly into sufficient water until each and every one of the ultra fine particles of the powdery admixture is completely wetted and evenly distributed in suspension in the water. The resultant liquid substance is now ready to be heated slowly, preferably in a double boiler arrangement, until it is brought to a boil. It is maintained at the boiling temperature for three minutes, and then the boiled liquid, which now has a syrupy character, is allowed to cool until its temperature is reduced to approximately forty degrees F., which temperature has been found to be about ideal for dipping or coating frozen confectionery products. The syrupy liquid coating material is now ready to be used in coating confectionery products, and best results have been obtained by dipping the confectionery products momentarily into the coating material while it is maintained at substantially a forty degree F. temperature. Anyone versed in the art will have sufficient knowledge to maintain the coating material at such temperature.

A good general formula for making a basic coating of any desired flavor in accordance with this invention is as follows:

| Ingredients | By weight | Per cent |
|---|---|---|
| Food containing starch material | 4.5 oz. | 7 |
| Sugar (cane) | 33.0 oz. | 51 |
| Malt powder | 3.0 | 5 |
| Dried skimmed milk powder | 24.0 | 37 |
| Water | 144.0 Fl. | 222 |

The food containing starch material used in the above formula may be corn starch, cocoa powder, tapioca, arrowroot starch, etc. The flavor, which is not given in the above formula, may be any flavoring material that is either soluble or dispersible in water. The flavor, however, must not be added until after the other ingredients have been admixed, boiled and allowed to cool, because the heat treatment will have a tendency to boil off or otherwise destroy the flavor if it is added prior to the step of heating.

The flavoring ingredients may be, as stated above, any material that is soluble or dispersible in water. One group of such materials includes dried or dehydrated berries, such as, for example, strawberries, raspberries, blackberries, loganberries, etc. Another group of flavoring ingredients that may be used with the above formula is natural comminuted fruits or berries. A further type of flavoring material that can be used consists of synthetic flavors provided they are either water soluble or made up into an emulsified form so that they can be readily dispersed in water.

To make a chocolate flavored coating material in accordance with this invention, it is merely necessary to substitute powdered cocoa for the food containing starch material in the aforementioned formula. A formula for making an excellent chocolate malt-flavored coating in accordance with this invention is as follows, the various dry ingredients being blended together by weight in the following proportions:

|  | Ounces |
|---|---|
| Cocoa powder | 23.0 |
| Dried skimmed milk | 37.0 |
| Sugar (cane) | 34.5 |
| Vanilla flavored sugar | .5 |
| Spray malt powder | 5.0 |

It is, of course, well understood that the taste characteristics of various people differ widely, and that slight variations in the above formula may be necessary to suit different tastes, but the aforementioned formulas will provide a generally satisfactory coating material capable of comparison with the present-day conventional fat or oil base coatings. It will be noted that the amount of flavoring is not given in any of the above formulas, except in the chocolate formula. That is because tastes differ so widely that it is thought best to let the individual manufacturer flavor to his own particular taste.

It is obvious that there will be some fat or oil in the chocolate flavored coating because of the amount of cocoa powder used therein. However, such fat or oil is not a free fat or oil as in the case of the conventional fat or oil base coatings. Chocolate flavored coatings made according to the above formula have approximately three percent fat, but such fat is chemically bound up in the cocoa powder and cannot be readily removed therefrom by normal commercial extraction processes.

Although we have only described in detail several modifications which the invention may assume, it will be apparent to those skilled in the art that the invention is not so limited, but that various other modifications may be made therein without departing from the spirit thereof or from the scope of the appended claims.

What we claim is:

1. A boiled viscous liquid dipping coating base for frozen confectionery products which is substantially devoid of free fats composed of by weight two parts of a food containing starch, sixteen parts of sugar, one part of malt powder, twelve parts of dried skimmed milk powder, and sixty-nine parts of water, having as an essential characteristic the property of remaining in liquid form at all temperatures above freezing, and a further essential characteristic of forming a firm, non-sticky coating that will not chip, crack or flake off the surface of frozen confectionery products when applied thereto at normal ice cream temperatures.

2. A boiled viscous liquid dipping coating for frozen confectionery products which is substantially devoid of free fats composed of by weight ten parts of cocoa powder, fifteen parts of dried skimmed milk powder, fourteen parts of cane sugar, two parts of malt powder and fifty-nine parts of water, having as an essential characteristic the property of remaining in liquid form at all temperatures above freezing, and a further essential characteristic of forming a firm, non-sticky coating that will not chip, crack or flake off the surface of frozen confectionery products when applied thereto at normal ice cream temperatures.

NORMAN M. THOMAS.
NORMAN H. THOMAS.